(12) United States Patent
Nobe et al.

(10) Patent No.: US 6,786,821 B2
(45) Date of Patent: Sep. 7, 2004

(54) GAME MACHINE, GAME PROCESSING METHOD AND INFORMATION STORAGE MEDIUM

(75) Inventors: Kazuhiko Nobe, Tokyo (JP); Shinichiro Niide, Tokyo (JP)

(73) Assignees: Konami Corporation, Tokyo (JP); KCE Tokyo, Inc., Tokyo (JP)

( * ) Notice: Subject to any disclaimer, the term of this patent is extended or adjusted under 35 U.S.C. 154(b) by 86 days.

(21) Appl. No.: 09/931,863

(22) Filed: Aug. 20, 2001

(65) Prior Publication Data

US 2002/0025841 A1 Feb. 28, 2002

(30) Foreign Application Priority Data

Aug. 31, 2000 (JP) ........................................ 2000-262552

(51) Int. Cl.[7] ........................... A63F 13/00; A63F 9/24; G06F 17/00; G06F 19/00
(52) U.S. Cl. .......................................... 463/31; 463/32
(58) Field of Search ............................ 463/1–9, 16–42, 463/44–47; 434/247–250; 482/8

(56) References Cited

U.S. PATENT DOCUMENTS

| | | | | |
|---|---|---|---|---|
| 4,207,087 A | * | 6/1980 | Morrison et al. | 463/9 |
| 4,285,517 A | * | 8/1981 | Morrison | 463/9 |
| 4,320,901 A | * | 3/1982 | Morrison et al. | 273/237 |
| 4,720,789 A | * | 1/1988 | Hector et al. | 463/33 |
| 5,667,459 A | * | 9/1997 | Su | 482/4 |
| 5,685,776 A | * | 11/1997 | Stambolic et al. | 463/46 |
| 6,001,013 A | * | 12/1999 | Ota | 463/7 |
| 6,116,908 A | * | 9/2000 | Takai | 434/250 |
| 6,227,968 B1 | | 5/2001 | Suzuki et al. | |
| 6,379,244 B1 | | 4/2002 | Sagawa et al. | |

FOREIGN PATENT DOCUMENTS

| | | |
|---|---|---|
| EP | 0 903 169 A2 | 3/1999 |
| EP | 0 974 954 A1 | 1/2000 |
| EP | 0 997 870 A1 | 5/2000 |

OTHER PUBLICATIONS

Dance Dance Revolution 2nd ReMix Perfect Guide, Konami Corporation, Oct. 1, 1999, p. 8.

* cited by examiner

Primary Examiner—Teresa Walberg
Assistant Examiner—Robert Mendoza
(74) Attorney, Agent, or Firm—Sughrue Mion, PLLC

(57) ABSTRACT

To increase a feeling of competitiveness between players of a music-oriented game. Based on evaluation of performance of the first and second players on their steps, the number of times step guidance is presented is varied. Specifically, while reference arrows 46, 48 are displayed, a plurality of timing guidance arrows 50, 62 approaching the reference arrows 46, 48 are also displayed on a game screen image 40, whereby a state of step timing gradually arriving is shown to the player. In addition, the number of timing guidance arrows 50 62, namely the number of times step guidance is presented to each player, is changed based on the result of evaluation on steps by each player.

22 Claims, 10 Drawing Sheets

F I G. 4
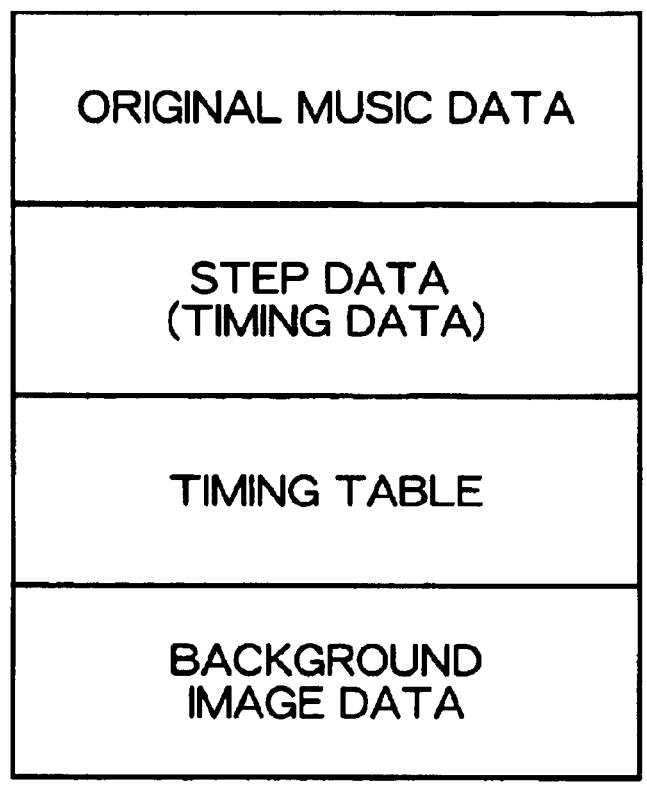

F I G. 5
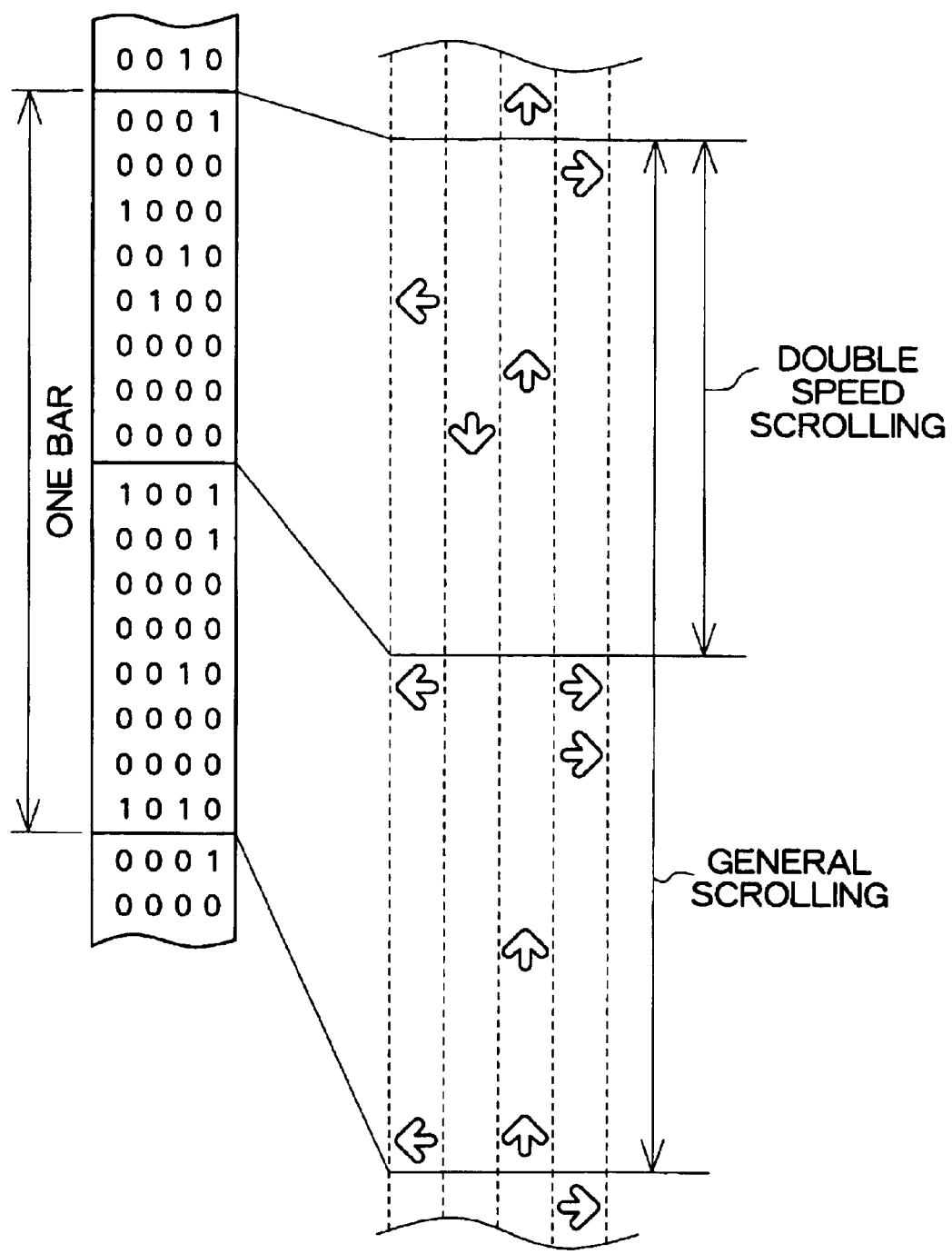

F I G. 6A
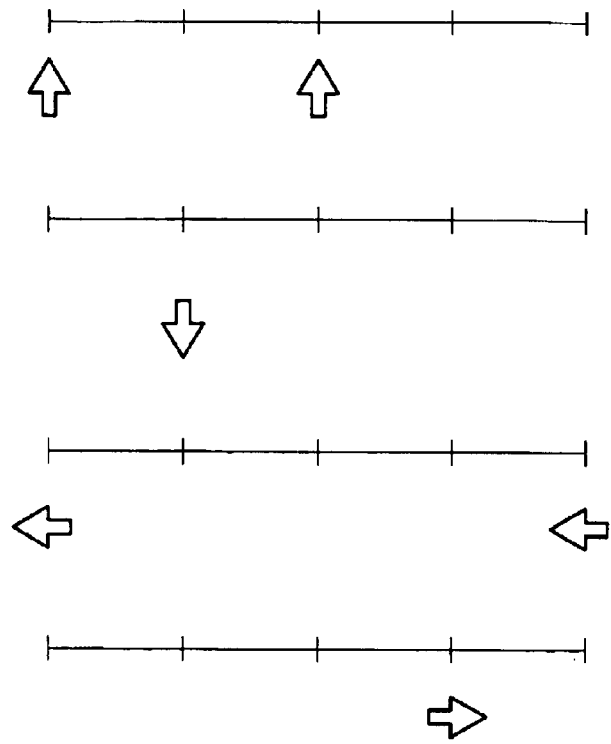
F I G. 6B
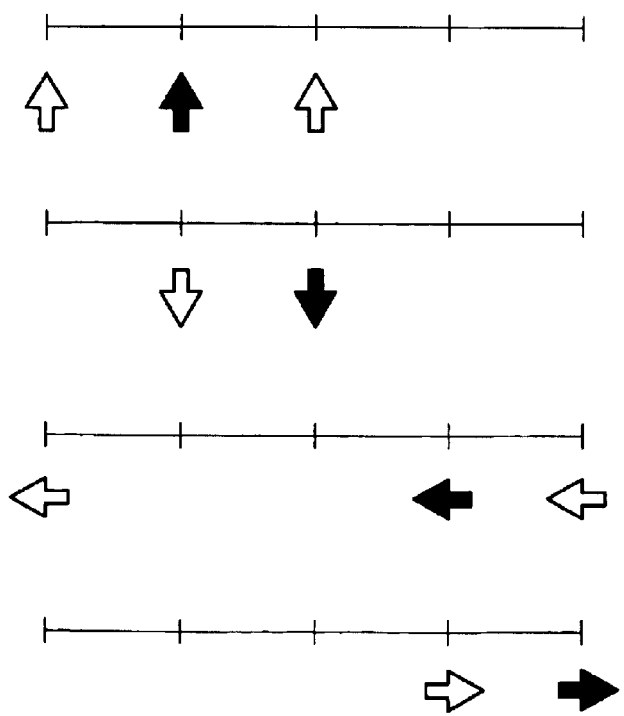

GAME MACHINE, GAME PROCESSING METHOD AND INFORMATION STORAGE MEDIUM

BACKGROUND OF THE INVENTION

1. Field of the Invention

The present invention relates to a game machine, a game processing method, and an information storage medium. In particular, the present invention relates to a technique for providing a game allowing a plurality of players to enjoy game operation in accordance with game music.

2. Description of the Related Art

A music-oriented game machine employing a dedicated controller having a plurality of marks attached thereon, each being indicative of a step position, and a sensor for determining whether or not a player's foot/feet is/are placed on a particular step position/positions, is popular. Typical examples of such a game machine or software are "Beat Mania™" and "Dance, Dance, Revolution™", both manufactured and sold by Konami Corporation. In these games, the player can enjoy the feeling of dancing by stepping on the dedicated controller in accordance with game music.

In such a music-oriented game machine, timing at which the player is required to step on each step position is determined according to the rhythm of game music and stored in the form of step data, and a gradually approaching step timing for each of the plurality of step positions is shown on a display based on the step data (timing data). The player, referring to the displayed image and listening to the rhythm of the music, puts their foot/feet on a presented step position/ positions on the dedicated controller. The player's performance in the game is evaluated based on the extent of difference between the time at which the player actually stepped on the dedicated controller and the step timing defined by the step timing data. This arrangement allows the player to enjoy the feeling of dancing, while also trying to get a good game score.

When the above mentioned music-oriented game machine is constructed as a match game machine, it is possible to have an arrangement in which the players are required to step in the same manner, while their actual step performances are evaluated to give them scores, so that they can compete in an attempt to get the best game score. However, only allowing the two players to step in the same manner so that they can compete based on their performance may be too simple, and preferably, the machine may have some contrivance to arouse a feeling of competitiveness between players.

SUMMARY OF THE INVENTION

The present invention has been conceived in view of the above, and aims to provide a game machine, a game processing method, and an information storage medium, employed in a music-oriented game, capable of further arousing a feeling of competitiveness between the players.

In order to achieve the above object, according to the present invention, there is provided a game machine for providing each of a first player and a second player with a game allowing a player to enjoy operation of the game using a controller according to game music, comprising: timing acquisition means for acquiring game operation timing at which each of the first player and the second player operates the game; timing data memory means for memorizing timing data defining game operation timing at which each of the first player and the second player is required to operate the game; timing guidance means for presenting the game operation timing defined by the timing data to each of the first player and the second player; game operation evaluation means for verifying the game operation timing acquired by the timing acquisition means with the game operation timing defined by the timing data to evaluate game operation by each of the first player and the second player; and operation timing changing means for presenting game operation timing different from the game operation timing defined by the timing data to at least one of the first player and the second player, based on a result of evaluation made by the game operation evaluation means.

According to another aspect of the present invention, there is provided a game process method for providing each of a first player and a second player with a game allowing a player to enjoy operation of the game using a controller according to game music, comprising: a timing acquisition step of acquiring game operation timing at which each of the first player and the second player operates the game; a timing data acquisition step of acquiring timing data defining game operation timing at which each of the first player and the second player is required to operate the game; a timing guidance step of presenting the game operation timing defined by the timing data to each of the first player and the second player; a game operation evaluation step of verifying the game operation timing acquired by the timing acquisition means with the game operation timing defined by the timing data to evaluate game operation by each of the first player and the second player; and operation timing changing step for presenting game operation timing different from the game operation timing defined by the timing data to at least one of the first player and the second player, based on a result of evaluation in the game operation evaluation step.

According to still another aspect of the present invention, there is provided an information storage medium storing a program for providing each of a first player and a second player with a game allowing a player to enjoy operation of the game using a controller according to game music, the program causing a computer to execute: a timing acquisition step of acquiring game operation timing at which each of the first player and the second player operates the game; a timing data acquisition step of acquiring timing data defining game operation timing at which each of the first player and the second player is required to operate the game; a timing guidance step of presenting the game operation timing defined by the timing data to each of the first player and the second player; a game operation evaluation step of verifying the game operation timing acquired by the timing acquisition means with the game operation timing defined by the timing data to evaluate game operation by each of the first player and the second player; and an operation timing changing step for presenting game operation timing different from the game operation timing defined by the timing data to at least one of the first player and the second player, based on a result of evaluation in the game operation evaluation step.

As described above, according to the present invention, the first and second players can enjoy game operation using respective controllers according to game music. While the players enjoy game operation, game operation timing is presented as a guidance to the first and second players based on timing data. When the first and second player conduct game operation using their controllers following the guidance, the time when they actually conducted game operation is acquired and verified with the timing defined by timing data for evaluation of the first and second players game operations, respectively. Based on the evaluation result, game operation timing which is different from that which is defined by the timing data is then presented as guidance to at least one of the first and second players. That is, the game operation timing which is presented to the player is different from that which is originally defined by timing data. As a result, the first and second players are presented with different game operation timing guidance from each other, which can resultantly increase a feeling of competitiveness between the players.

Note that, according to one aspect of the present invention, the timing guidance means (step) may show each of the first and second players a first operation timing instruction image, as well as a plurality of second operation timing instruction images which gradually approach the first operation timing instruction image on the display, to thereby show a state in which game operation timing is arriving. In addition, the operation timing number change means may increase or decrease the number of second operation timing instruction images approaching the first operation timing guidance image with respect to the first or second player, to thereby increase or decrease the number of times game operation timing is to be presented as guidance to the first or second player. This makes it possible to inform the first and second players of a change of game operation timing and of the number of times the game must be operated (the number of game operation timing) in an easily understandable manner.

BRIEF DESCRIPTION OF THE DRAWINGS

FIG. 4 is a diagram showing a structure of game music data.

FIG. 5 is a diagram explaining a procedure for creating a timing guidance arrow based on step data.

FIG. 6 is a diagram explaining a manner of step addition processing.

PREFERRED EMBODIMENTS OF THE PRESENT INVENTION

The entire disclosure of the corresponding Japanese application 2000-262552 filed on Aug. 31, 2000 including specification, claims, drawings and summary, is incorporated herein by reference.

In the following, preferred embodiments of the present invention will be described in detail with reference to the accompanying drawings.

Figure 1:
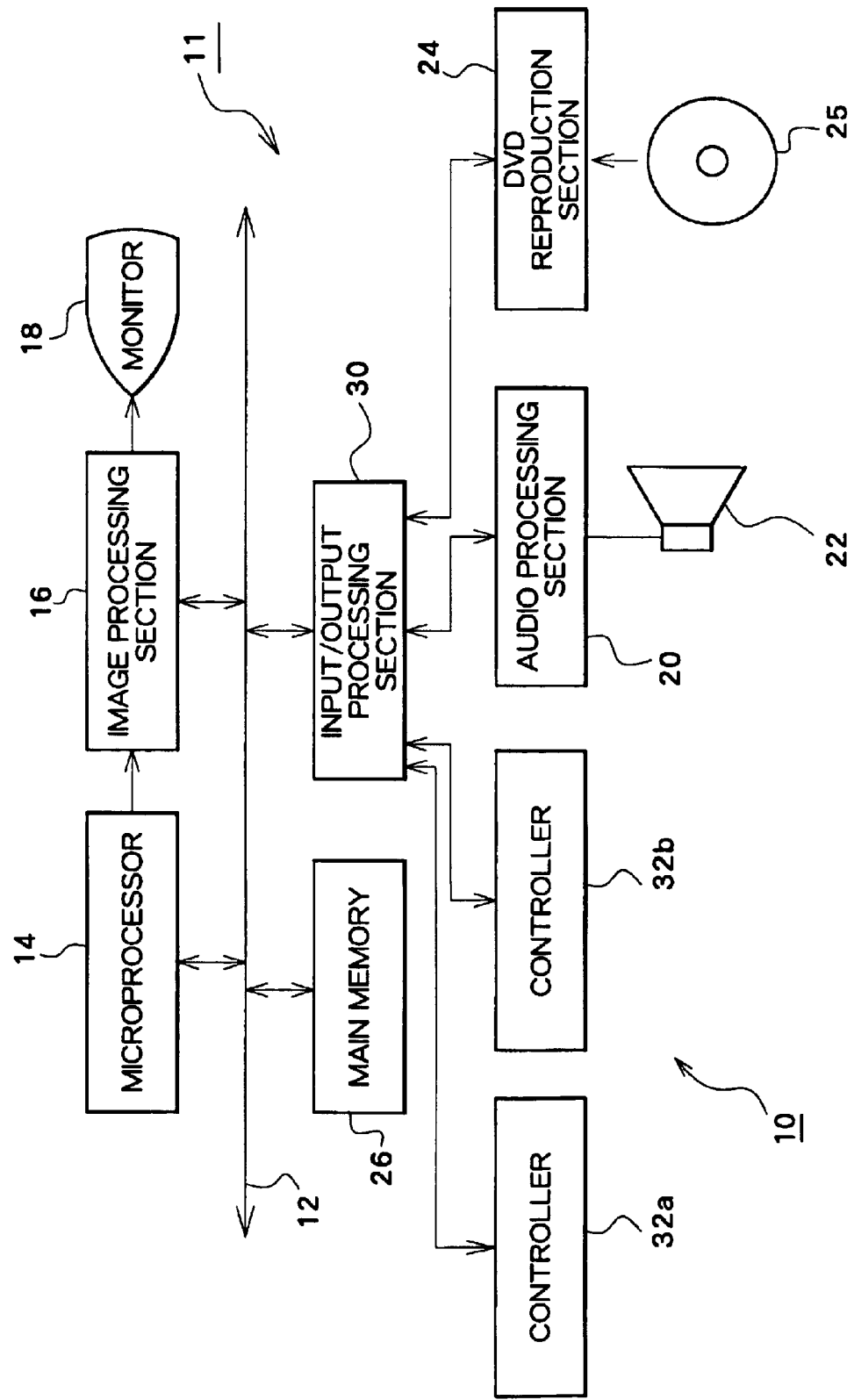
FIG. 1 is a diagram showing a structure of a game machine according to a preferred embodiment of the present invention.

FIG. 1 is a diagram showing a structure of a game machine according to a preferred embodiment of the present invention. The game machine 10 shown in FIG. 1 comprises a DVD 25, or an information storage medium, mounted on a home-use game machine 11, which is connected to a monitor 18 and a speaker 22. Here, a game program and game data for a music-oriented game having a match play mode is stored in the DVD 25, and controllers 32a, 32b, which serve as dedicated controllers, are connected so that two players can enjoy a music-oriented game in a match play mode. Note that whereas a DVD 25 is used here to supply a game program and game data to the home-use game machine 11, any other information storage media, such as a CD-ROM or a ROM card, may be used instead. Alternatively, a game program and game data may be remotely supplied to the home-use game machine 11 via a communication network.

A home-use game machine 11 comprises a microprocessor 14, an image processing section 16, a main memory 26, and an input/output processing section 30, mutually connected via a bus 12 for data exchange, with the input/output processing section 30 being further connected to the controllers 32a, 32b, an audio processing section 20, and a DVD reproduction section 24. The respective elements of the home-use game machine 11 other than the controllers 32a, 32b are all accommodated in a predetermined single housing. By way of example, the monitor 18 may be a home TV receiver, and the speaker 22 may be a speaker incorporated into the home TV receiver.

The microprocessor 14 controls the respective elements of the home-use game machine 11 based on an operating system stored in a ROM, not shown, and a game program read from the DVD 25. The bus 12 is used for exchanging addresses and data among the respective elements of the home-use game machine 11. The main memory 26 is used for storing game programs and game data read from the DVD 25 as necessary. A graphics processing unit 16, which has a structure comprising a VRAM, receives image data from the microprocessor 14, and draws a game screen image on the VRAM based on the received input data. The image processing section 16, moreover, converts the content of the image data into a video signal, and outputs the signal to the monitor 18 at a predetermined timing.

The input/output processing section 30 serves as an interface for relaying data communication between the controllers 32a, 32b, the audio processing section 20, the DVD reproduction section 24, and the microprocessor 14. The controllers 32a, 32b each serve as input means via which a player operates a game. Two controllers are provided so that a match game can be played. The input/output processing section 30 periodically (for example, every 1/60 seconds) scans the operation state of the various buttons of the controllers 32a, 32b, and supplies an operation signal indicative of a scanning result to the microprocessor 14 via the bus 12. The microprocessor 14 knows the kind of game operation conducted by the player and a time at which the player conducted the game operation. The audio processing section 20, which has a structure comprising a sound buffer, reproduces music data, game sound effects, and so on, which were read from the DVD 25 and temporarily stored in the sound buffer, and outputs them via the speaker 22. The DVD reproduction section 24 reads data, including a game program and game data, from the DVD 25 in response to a command from the microprocessor 14.

Figure 2:
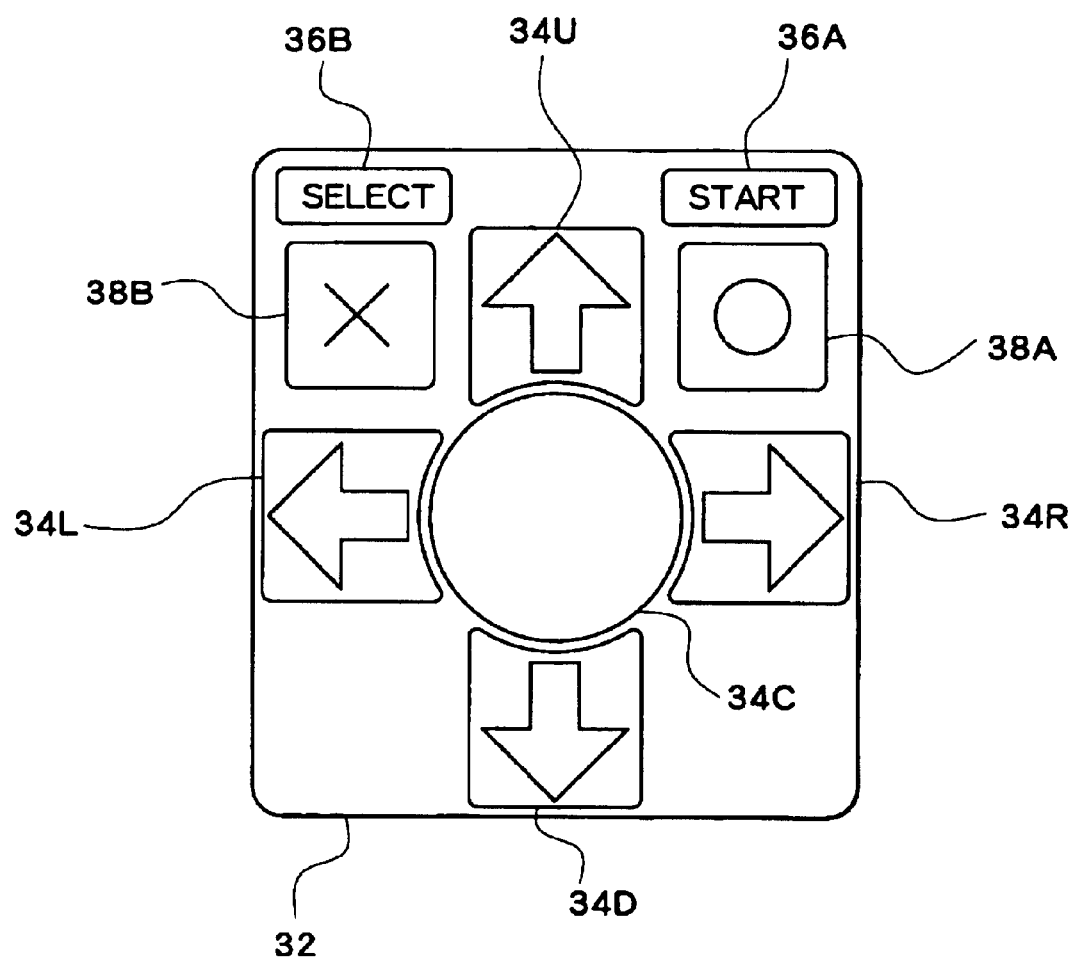
FIG. 2 is a diagram showing an example of a controller.

FIG. 2 is a diagram showing an example of controllers 32a, 32b. The controllers 32a, 32b have identical shapes and structures. A controller 32 is shown in FIG. 2 as an example of such controllers 32a, 32b. The controller 32 shown is a controller dedicated particularly to playing of a music-oriented game. The controller 32 is made of a mat-like member having a size appropriate for use as a dance stage. When a player steps on the controller 32, operation signals indicative of the positions of the player's feet are sent to the home-use game machine 11. As shown, a substantially round central segment 34C is provided at the center on the surface of the controller 32, and direction button input segments 34U, 34D, 34L, 34R are provided above, below, to the left of, and to the right of the central segment 34C, respectively. Further, to the right and to the left of the direction button input segment 34U there are provided an O button input segment 38A and an X button input segment 38B, respectively. Moreover, a start button input segment 36A is provided above the O button input segment 38A, while a selection button input segment 36B is provided above the X button input segment 38B. A rightward arrow, a leftward arrow, an upward arrow, and a downward arrow are attached on the direction button input segments 34R, 34L, 34U, 34D, respectively. An O mark is attached (printed) on the surface of the O button input segment 38A, and an X mark is attached on the surface of the X button input segment 38B. A label "START" is attached on the start button input segment 36A, and a label "SELECT" is attached on the selection button input segment 36B.

Sensors are embedded under the direction button input segments 34U, 34D, 34L, 34R, the O button input segment 38A, the X button input segment 38B, the start button input segment 36A, and the selection button input segment 36B, so that, when the player puts their foot/feet on the respective segments, an operation signal indicative of the player's foot being placed on the segment is sent to the home-use game machine 11. The direction button input segments 34U, 34D, 34L, 34R are used mainly to input dance steps as well as to make various menu selections. The start button input segment 36A is used to start a game as well as to make various decisions. The selection button input segment 36B is used mainly to retrieve various menu screen images. The O button input segment 38A is used mainly to make various decisions. The X button input segment 38B is used mainly to apply various cancellations and to forcibly end the game.

Figure 3:
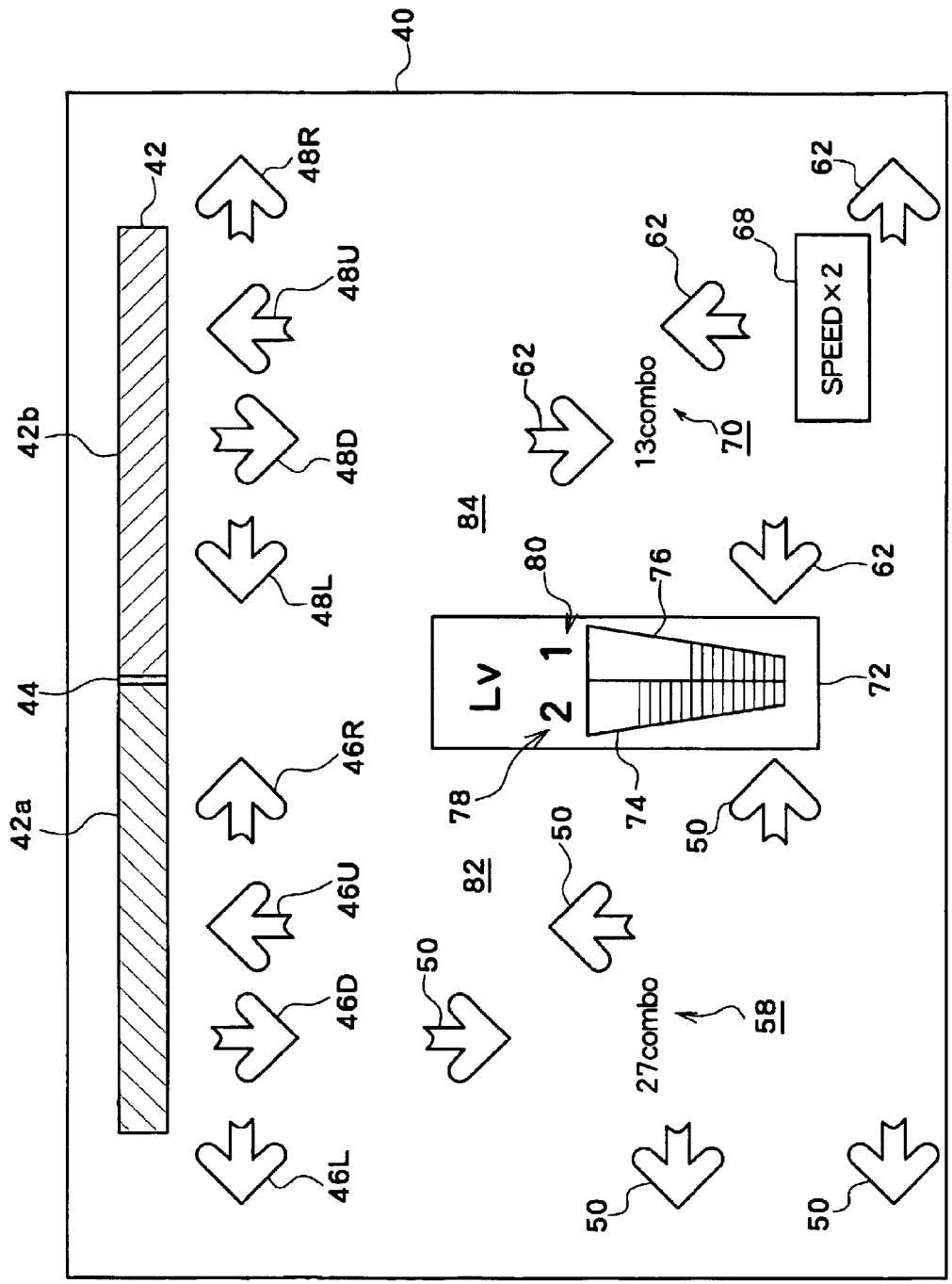
FIG. 3 is a diagram showing an example of a game screen image.

FIG. 3 is a diagram showing an exemplary game screen image prepared and shown on the monitor 18 based on a game program and game data read from the DVD-ROM 25. In the shown game screen image 40, a background image, not shown, is displayed over the entire screen. A first player screen image area 82 and a second player screen image area 84 are provided on the left and right halves, respectively, of the game screen image 40. The first player screen image area 82 is a display area for displaying step timing mainly for a first player, while the second player screen image area 84 is a display area for displaying step timing mainly for a second player.

Reference arrows (first operation timing instruction images) 46L, 46D, 46U, 46R in a horizontal alignment are shown on the upper portion in the first player screen image area 82, and a plurality of timing guidance arrows (second operation timing instruction images) 50, which will move upwards as time elapses, are shown below the reference arrows 46. A combo number 58 is shown around the middle portion of the screen 82. Likewise, reference arrows (first operation timing instruction images) 48L, 48D, 48U, 48R in a horizontal alignment are shown on the upper portion of the second player screen image area 84, and a plurality of timing guidance arrows (second operation timing instruction images) 62, which will move upwards as time elapses, are shown below the reference arrows 48. A combo number 70 is shown around the middle portion of the screen 84, and an effect banner 68 is shown on the lower portion of the screen 84. The combo numbers 58, 70 indicate the number of successive game operations conducted by the respective players at exact timing as prompted, which corresponds to "PERFECT", described later, or at closer timing, which corresponds to "GREAT", described later. The effect banner 68 describes a change of timing guidance currently imposed on a corresponding player. That is, in this music-oriented game, which is played by two players, timing guidance to be presented to a player inferior in step performance of the two players is subjected to change of timing guidance, and the content of the change is represented by the effect banner 68. In this drawing, an effect banner 68 is shown only for the second player. This banner means that the timing guidance arrow 62 scrolls at a speed twice as fast as that for the first player. In the case where such a change for timing guidance is also imposed on the first player, an effective banner would also be shown for the first player.

The arrows 46L, 48L are correlated with the direction button input segments 34L. The arrows 46D, 48D are correlated with the direction button input segments 34D. The arrows 46U, 48U are correlated with the direction button input segments 34U. The arrows 46R, 48R are correlated with the direction button input segments 34R. The first player can obtain a higher score by stepping on one of the direction button input segments 34L, 34D, 34U, 34R at time when corresponding timing guidance arrow 50 overlaps with a corresponding one of the reference arrows 46L, 46D, 46U, 46R, and the first dance gauge 42a thus extends. Likewise, the second player can obtain a higher score by stepping on one of the direction button input segments 34L, 34D, 34U, 34R at a time when a corresponding timing guidance arrow 62 overlaps with a corresponding one of the reference arrows 48L, 48D, 48U, 48R, and the second dance gauge 42b thus extends. This drawing shows the state in which the first player is required to step sequentially on the direction button input segment 34D, 34U, 34L, 34R, while the second player is required to step sequentially on the direction button input segment 34D, 34U, 34L, 34R. Every time the players are required to step, their stepping performance is evaluated, and corresponding evaluation messages are displayed below the reference arrows 46, 48. Specifically, according to an extent of coincidence between a position and time at which the player is required to step on and those at which the player actually did step on, suitable messages are displayed, including "PERFECT", "GREAT", "BOO", and so on, for the best to the worst in this order.

It should be noted that a player does not always have to operate the controller 32 at very exact timing when the timing guidance arrows 50, 62 fully overlap with the corresponding reference arrows 46, 48, respectively, in order to get a positive evaluation. A player can get a score which takes into consideration the extent of coincidence between the time at which the timing guidance arrows 50, 62 overlaps with the corresponding reference arrows 46, 48, respectively, and the time at which the player actually operates the controller 32. Note that the timing guidance arrows 50, 62 are displayed based on the step data, described later.

The timing guidance arrows 50, 62 are specifically displayed as follows. That is, after game music reproduction begins, the microprocessor 14 reads data on step timing within a guidance presentation range from the step data, and generates image data for timing guidance arrows 50, 62 based on the step data. Note that a guidance presentation range is determined here as a range covering two bars subsequent to the current point in time. Image data is configured such that a timing guidance arrow relative to the nearest step timing be displayed in the uppermost portion of the timing guidance arrow display area, with those relative to farther step timing displayed in a lower portion accordingly. This processing is repeated in a predetermined cycle.

In displaying the arrows, for example, the timing guidance arrow 50 indicative of a time at which the player is required to step on the direction button input segment 34L is shown below the reference arrow 46L. Similarly, the timing guidance arrow 50 indicative of a time at which the player is required to step on the direction button input segment 34D is shown below the reference arrow 46D; the timing guidance arrow 50 indicative of a time at which the player is required to step on the direction button input segment 34U is shown below the reference arrow 46U; and the timing guidance arrow 50 indicative of a time at which the player is required to step on the direction button input segment 34R is shown below the reference arrow 46R. Likewise, for example, the timing guidance arrow 62 indicative of a time at which the player is required to step on the direction button input segment 34L is shown below the reference arrow 48L. Similarly, the timing guidance arrow 62 indicative of a time at which the player is required to step on the direction button input segment 34D is shown below the reference arrow 48D; the timing guidance arrow 62 indicative of a time at which the player is required to step on the direction button input segment 34U is shown below the reference arrow 48U; and the timing guidance arrow 62 indicative of a time at which the player is required to step on the direction button input segment 34R is shown below the reference arrow 48R.

The head of each guidance presentation range, namely, a position in the vertical direction with respect to the screen where the reference arrows 46, 48 are displayed, corresponds to a part of the game music, which is then being played. The head of the guidance presentation range shifts from the beginning of the music toward the end thereof by a predetermined amount for each processing cycle. Accordingly, the timing guidance arrows 50, 62 gradually move upward as the music progresses. As the timing guidance arrows 50, 62 are displayed gradually approaching the reference arrow 46, 48, respectively, the player can easily ascertain the arrival of step timing by referring to the game screen image 40.

In the upper portions of the first player screen image area 82 and the second player screen image area 84, there is shown a dance gauge 42 indicating the better of the two players. Between the first player screen image area 82 and the second player screen image area 84, there is shown a combo gauge 72. The dance gauge 42 comprises a first player gauge 42a and a second player gauge 43b shown on the left and right halves thereof, respectively, with a separation image 44 in between. Supposing that a first player is better than a second player, the first dance gauge 42a extends rightward and the second dance gauge 42b contracts accordingly, causing the separation image 44 to move rightward. Supposing that a second player is better than a first player, on the other hand, the second dance gauge 42b extends leftward and the first dance gauge 42a contracts accordingly, causing the separation image 44 to move leftward. In this manner, the first and second players can know whether or not he himself is better than the other player with reference to the position of the separation image 44.

The combo gauge 72 comprises a first combo gauge 74, a second combo gauge 76, and level indicators 78, 80 for indicating the current gauge levels for the respective players. Moreover, a combo number 58, or the number of successively displayed messages "GREAT" or "PERFECT", described above, is shown in the middle portion of the first player screen image area 82. Increase of the combo number 58 causes extension of the first combo gauge 74. Similarly, a combo number 70 is shown in the middle portion of the second player screen image area 84. Increase of the combo number 70 causes increase of the second combo gauge 76.

When the first combo gauge 74 becomes full, the level indicator 78 increases by one with the first combo gauge 74 becoming zero or disappearing altogether. Then, it is possible to apply a change to the timing guidance for the second player. Specifically, any of the changes, including increase of the timing guidance arrows 62, change of the speed of the arrows 62, change of the direction of the arrows 62, change of the brightness of the arrows 62, can be imposed to the second player. Specific content of the change is determined according to the current gauge level, indicated by the level indicator 78, and the type of player character selected at that time. Generally, a change of timing guidance which is more effectively disturbing the competitor player is applied when a gauge level becomes higher when the first or second combo gauge 75, 76 becomes full. Note that the gauge level varies from the first to third steps.

Among various kinds of changes of timing guidance, increase of timing guidance arrow 62 is a change such that the number of timing guidance arrows 62, namely, the number of steps presented to the player increases exceeding that which is originally defined by the step data (the number of times at which the player is required to step (or to operate the game) according to the step data). Variation of step (arrow) addition will be described later. A change of a speed is a change such that a timing guidance arrow 62 moves upward faster or slower. Here, three types of speed change, namely, half, twice, and three times the speed, are available. Therefore, the guidance level for step timing is changed. Specific processing for speed change will be described later. A change of direction is a change such that a timing guidance arrow 62 changes to direct in a different direction. Three types of direction change are available here, namely "mirror", in which the arrow changes to direct in an opposite direction, "left", in which the arrow rotates leftward by 90 degrees, and "right", in which the arrow rotates rightward by 90 degrees. A change of brightness is a change such that a semi-translucency rate at which a timing guidance arrow 62 is superimposed on the game screen image 40 in a semi-translucent manner is changed so that the timing guidance arrow 62 appears or disappears while it moves upward. This can also cause a change of guidance level for step timing. Here, four kinds of brightness change are available, namely "hidden", in which the arrow disappears halfway the path along which the arrow moves upwards on the second player screen image area 84, "super hidden", in which the arrow disappears immediately after it has appeared on the second player screen image area 84, "sudden", in which the arrow suddenly appears halfway along the path, and "super sudden", in which the arrow suddenly appears near the reference arrow 48.

As described above, every time the first combo gauge 74 becomes full, the game for the second player becomes more difficult as a result of a change of a guidance level for step timing or increase of the number of required steps. Likewise, when the second combo gauge 76 becomes full, the level indicator 80 increases by one with the second combo gauge 76 becoming zero, and similar change of guidance timing is applied to the first player.

When successive display of messages "PERFECT" or "GREAT" on the first player screen image area 82 discontinues, the combo number 58 disappears with the level display 78 returning to one and the first combo gauge 74 returning to zero. Likewise, when successive display of messages "PERFECT" or "GREAT" on the second player screen image area 84 discontinues, the combo number 70 disappears with the level indicator 80 returning to one and the second combo gauge 76 becoming zero. The combo number 58, 70 reappears when the corresponding player obtains "PERFECT" or "GREAT" messages five or more successive times.

Here, data stored in a DVD-ROM 25 will be described. The DVD-ROM 25 stores game music data in order to cause a home-use game machine 11 to operate as a music-oriented game, as well as a game program, various game effect sound data, and various game image data.

FIG. 4 is a diagram describing game music data corresponding to some game music, which is recorded in a DVD-ROM 25. As shown, game music data contains original music data, step data, a timing table, and background image data. Original music data is data concerning general popular music, for example, stored as original music in a predetermined stream data format. The DVD reproduction section 24, which reads original music data in response to a command from the microprocessor 14, can process the data, if necessary, and supply the data directly, i.e., without passing through the bus 12, to the audio processing section 20. The audio processing section 20, after receiving the data directly from the DVD reproduction section 24, converts the data into analogue data, and supplies the converted data to the speaker 22.

Step data is data defining a time at which a player is required to step, or to operate a game, while corresponding game music is being reproduced. Step data is configured according to the rhythm of corresponding music data. Two or more sets of step data may be prepared for a single set of game music data so that a desirable set of step data may be selected according to a difficulty level, a play mode, and so on. Step data specifies which of the buttons of the controller 32 should be stepped on at which beat when bars of corresponding game music are dissolved into blocks according to a predetermined beat number such as four beats or eight beats.

A timing table is prepared for matching timing between game music and step data. With reference to the timing table, the microprocessor 14 can specify the step data corresponding to the particular section of game music currently being played. Background image data, either motion or still image data, represents an image shown as background in the game screen image 40, shown in FIG. 3, for example. A background image suitable for the atmosphere of game music is selected for every piece of game music to therewith visually stimulating the player. Note that any image, such as an image of a game character selected by a user, other than a background image based on the background image data, may be displayed overlapping with the background.

Here, a process for displaying timing guidance arrows 50, 62 based on step data and a process for changing the scroll speed of the timing guidance arrows 50, 62 will be described. FIG. 5 is a diagram showing an example of step data. The format of step data is determined such that step data designates step timing in units of $1/256$ bar. Here, however, for brevity, one bar is divided into sixteen parts, as shown in the drawing, so that step timing is designated in units of $1/16$ bar. A step at each moment in time is specified by data of four bits. That is, each bit corresponds to each of the direction button input segments 34, wherein "0" prompts not to step on the corresponding direction button input segment 34, and "1" prompts to step on the corresponding direction button input segment 34. In the case where a default guidance presentation range is of one bar, display positions of timing guidance arrows 50, 62 are determined such that successive steps in one bar are shown in the full length of the respective first and second player screen image areas 82, 84, and the images of the timing guidance arrows 50, 62 are superimposed to be displayed in the first and second player screen image areas 82, 84, respectively. For a player for whom the timing guidance arrows 50, 62 must scroll at a double speed, the display positions of the timing guidance arrows 50, 62 are determined such that successive steps in a half bar are shown in the full length of the first or second player screen image area 82, 84. Likewise, for a player for whom the timing guidance arrows 50, 62 must scroll at a half speed, successive steps in two bars are shown in the full length of the first or second player screen image area 82, 84. For a player for whom the timing guidance arrows 50, 61 must scroll at three times the speed, successive steps in one third of a bar are shown in the full length of the first or second player screen image area 82, 84. As described above, a guidance level for the first or second player can be changed by changing the speed at which the timing guidance arrows 50, 62 approach the reference arrows 46, 48, respectively. That is, when the first combo gauge 74 for the first player, for example, becomes full, the scroll speed for the timing guidance arrow 62 for the second player, and thus the guidance level for the second player, is changed. This can resultantly increase a feeling of competitiveness between the first and second players. Note that, preferably, the scroll speed is changed in a stepwise manner. Specifically, when doubling the scroll speed, preferably, the scroll speed is changed by a few steps from a standard speed to a double speed, so that the player is not excessively bothered by a change of the scroll speed.

Next, addition of a timing guidance arrow 50, 60 will be described. As described above, when the first player accumulates the combo pieces until the first combo gauge 74 becomes full, or when the second player accumulates the combo pieces until the second combo gauge 76 becomes full, the number of timing guidance arrows 50 or 62 for the first or second player is increased according to the gauge level or the selected game character, upon which the number of steps required to the corresponding player is increased. FIGS. 6A to 10B are diagrams explaining manners of addition of a timing guidance arrow 50, 62. Six manners of addition are available here. Which manner will actually be employed may be determined according to a random number.

According to a first manner, one step is inserted randomly between steps. Here, the length of one beat divided into n pieces is referred to as "n divided length". In this manner of addition, one step is randomly inserted in units of sixteen divided length between steps which are separated from each other by an extent of two divided length or longer.

According to a second manner, steps are added such that the player is always required to step with his two feet. Specifically, at a time at which the player is originally required to make a single step, another step, or a step in the opposite direction from the original step, is added. FIGS. 6A and 6B are diagrams explaining step addition according to this manner, in which the four lateral lines each correspond to each of the direction button input segments 34 with an index given thereto for every bar. An outlined arrow stands for an original step time at which a player is required to step on a corresponding direct button input segment 34 according to step data, while a black arrow stands for a step time at which the player is additionally required to step as a result of addition of steps in this manner. In FIG. 6A, it is learnt that a player is required to make a single step, that is, only a single arrow is allocated, at each of the beginnings of the second, third, fourth, and fifth bars. Therefore, at the beginning of the second bar, for example, where the player is required to step on the direction button input segment 34D, another arrow concerning a direction button input segment 34 in the opposite direction, namely, the direction button input segment 34U here, is added, as shown in FIG. 6B. Likewise, at the beginning of the third bar, where the player is required to step on the direction button input segment 34U, another arrow concerning a direction button input segment 34 in the opposite direction, namely, the direction button input segment 34D here, is added. In this manner, an arrow concerning a direction button input segment 34 in the opposite direction from that of the original arrow is added at the beginning of each of the fourth and fifth bars.

Figure 7A:
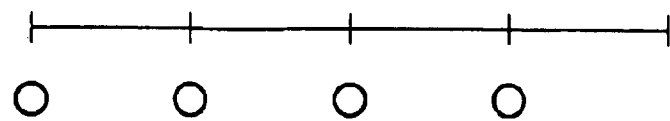
FIG. 7 is a diagram explaining another manner of step addition processing.
Figure 7B:
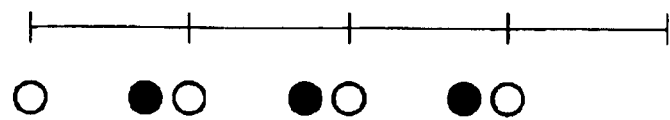

According to a third manner, a step, or an arrow, is added such that a player is required to step as if he skips. As shown in FIGS. 7A and 7B, a step having a twelve divided length is added immediately before the latter one of two steps which are separated from each other by an extent equal to one beat. This addition is applied only when a single arrow is allocated to the first step of the two steps, and the direction of the added arrow is the same as that of the first step. Referring to FIGS. 7A to 10B, an outlined circle stands for a time at which a player is originally required to step according to step data, while a black circle stands for a time at which a player is additionally required to step as a result of addition of steps in this manner.

Figure 8A:
FIG. 8 is a diagram explaining still another manner of step addition processing.
Figure 8B:
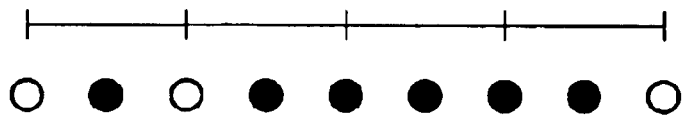

According to a fourth manner, a step, or an arrow, is added such that a player is required to make successive steps each having eight divided length. As shown in FIGS. 8A and 8B, as many steps as possible, each of eight divided length, are inserted between steps. Only a single arrow is added to each time, and the direction of an arrow to be added is determined randomly.

Figure 9A:
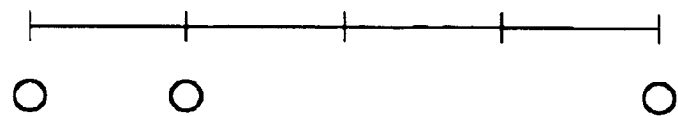
FIG. 9 is a diagram explaining yet another manner of step addition processing.
Figure 9B:
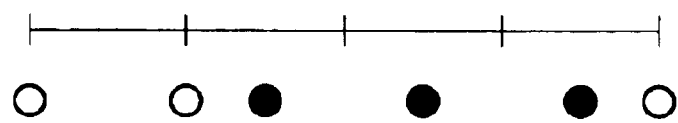

According to a fifth aspect, a back beat step is added. As shown in FIGS. 9A and 9B, a step of eight divided length is inserted into a back beat position between steps which are separated from each other by an extent equal to four divided length or longer. Only a single arrow is added to each time, and the direction of an arrow to be added is determined randomly.

Figure 10A:
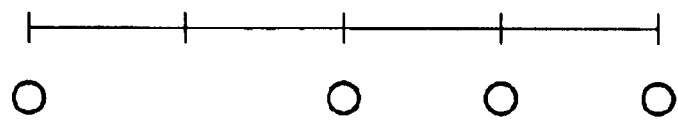
FIG. 10 is a diagram explaining yet another manner of step addition processing.
Figure 10B:
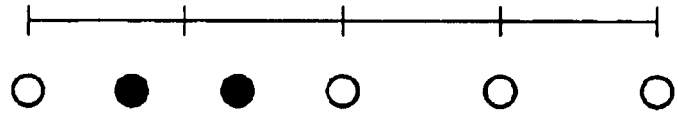

According to a sixth aspect, a step is added such that a player is required to step on a triplet. As shown in FIGS. 10A and 10B, a step of a six divided length is inserted between steps which are separated from each other by an extent of two divided length or longer. Only a single arrow is added to each time, and the direction of an arrow to be added is determined randomly.

As described above, when one player steps well, the other player is required to make an increased number of steps so that the game with the other player becomes more difficult. This resultantly increases a feeling of competitiveness between the players. Moreover, when the other players copes well with the newly added steps, the first or second combo gauge 74, 76 or the first or second dance gauge 42a, 42b for that player extends faster than the other player, and finally becomes better than the one player.

Figure 11:
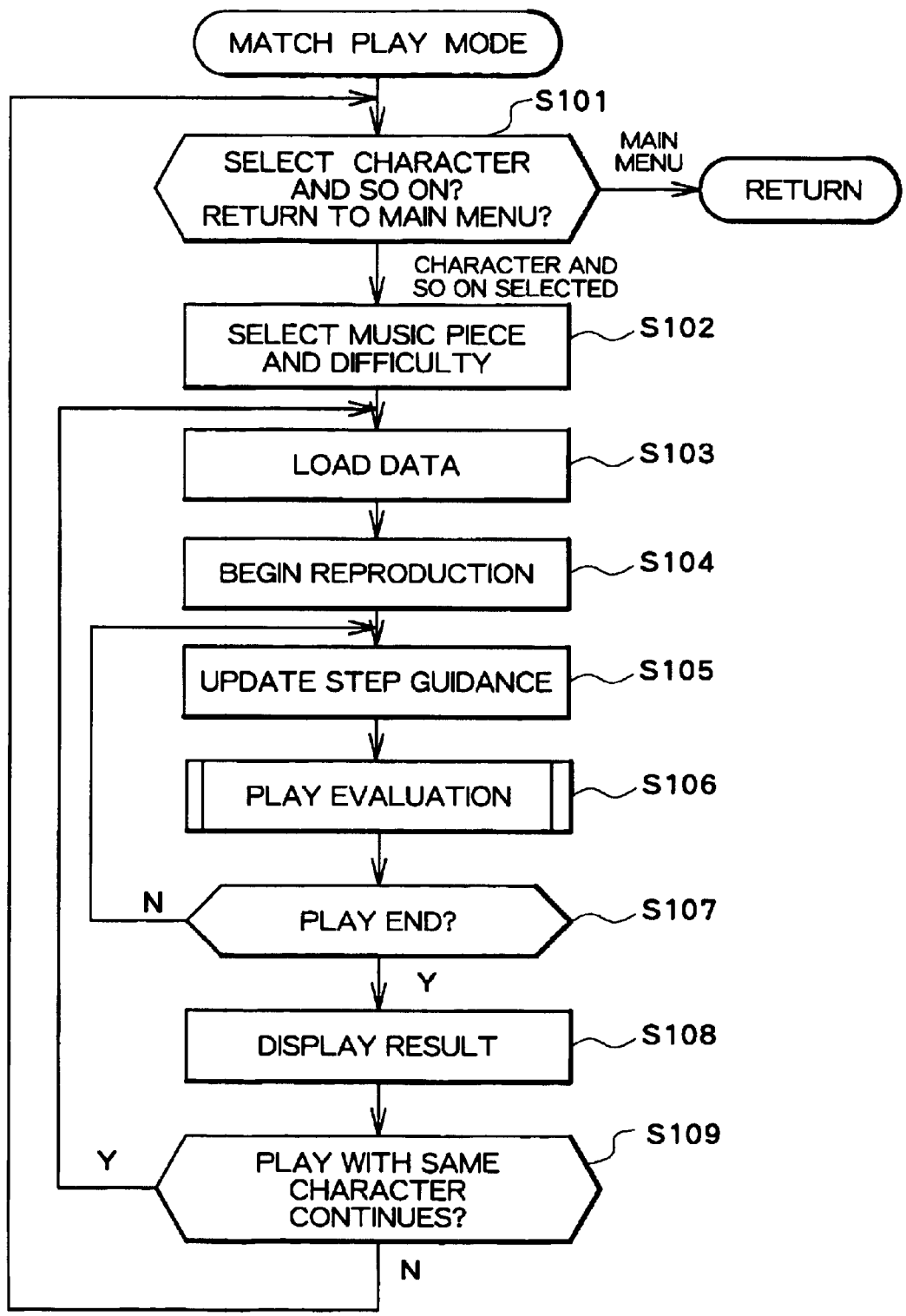
FIG. 11 is a flowchart explaining operation of a game machine in a "match play mode" in a preferred embodiment of the present invention.
Figure 12:
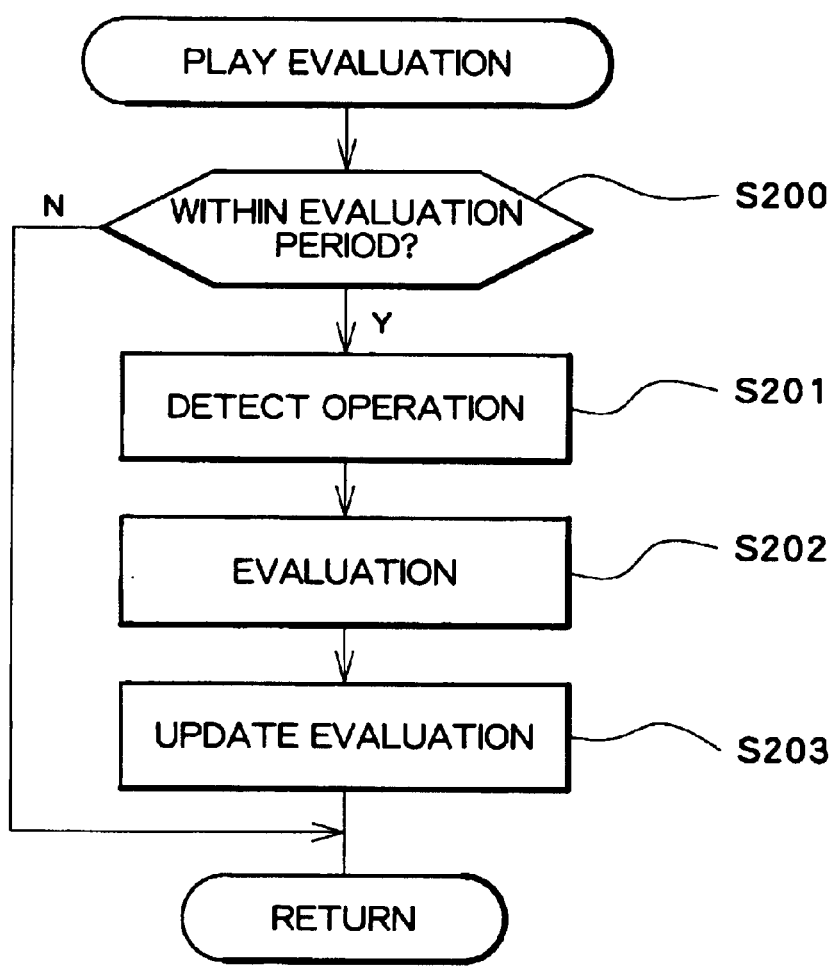
FIG. 12 is a flowchart explaining play evaluation processing.

Here, game program processing executed by a home-use game machine 11 will be described. FIGS. 11 and 12 are flowcharts describing processing according to a game program stored in the DVD-ROM 25. When the player inserts a DVD-ROM 25 in the DVD reproduction section 24 and turns on the power of the home-use game machine 11, an operating system stored in the ROM, not shown, is executed, causing various initialization operations to be carried out. In the operation, only a part of the game program necessary for the present processing is loaded from the DVD-ROM 25 to the main memory 26. According to the game program, a game title, and so on is displayed on the monitor 18, and a main menu is thereafter displayed either automatically or under the control of the controller 32. When the player selects a "match mode", game processing in the "match mode" begins.

In this process, a selection screen image, not shown, where a game character and so on is selected, is displayed on the monitor 18. Each game character stands for each type of timing guidance change, which can be imposed on a competitor player. On the selection screen image, game characters are displayed together with the descriptions of the type of changes allocated thereto. While this screen image is being displayed, the microprocessor 14 monitors whether or not the player has instructed to return to the main menu or selected a game character and so on (S101). A player who is the first to step on the start button input segment 36A is entitled to act as an active player, leaving the other player to act as a non-active player. When the active player steps on an X button input segment 38B with the game character selection screen image being displayed, the match play mode is cancelled and the main menu is retrieved. Note that, when one player steps on the start button input segment 36A and, thereafter, selects a character before the other player steps on the start button input segment 36A, the game machine 10 itself is brought to serve as a non-active player, so that the player plays the game against the computer. After the selection of a character and so on, a screen image for selection of music and difficulty is then displayed, prompting the player to select music and difficulty (S102).

After the player selected music and difficulty using the controller 32, game music data of the selected music is loaded (S103). Specifically, a group of data, shown in FIG. 4, is loaded. Among the grouped data, original music data is directly supplied from the DVD reproduction section 24 to the audio processing section 20, which promptly begins music reproduction (S104). Other data is loaded to the main memory 26.

Next, the microprocessor 14 generates image data for step guidance, as shown in FIG. 3, for example, based on the step data among the game music data read, and outputs the resultant image data to the monitor 18 to update the step guidance (S105). In this process, the microprocessor 14 determines correlation between the step data and the original music data with reference to the timing table. Note that the step data and the timing table used here are those which correspond to the music and difficulty selected by the player at S102.

In the above, referring to change flags, stored in advance in the main memory 26 so as to correspond to each player, the microprocessor 14 determines whether or not any change of timing guidance has been imposed on each player. Should it have been imposed, the microprocessor 14 determines the type of the change imposed, and generates image data for step guidance according to the type of change imposed.

Thereafter, performance of the players are evaluated (S106). FIG. 12 is a flowchart explaining play evaluation process. Specifically, as shown, whether or not the current play position falls within an evaluation period is initially determined based on the current play position and step data (S200). Note that an evaluation period is a period during which the player's step timing is compared with corresponding timing defined by the step data and, specifically, consists of a predetermined amount of preceding and subsequent time periods with respect to a certain point defined as step timing by step data.

When a current play position falls within an evaluation period, the operation states of the controllers 32a, 32b of the respective players are determined (S201), and the respective players' stepping performances are evaluated based on the states (S202). That is, reference to step data makes it possible to ascertain to which of the direction button input segments 34L, 34U, 34D, 34R the step position currently within an evaluation period relates. Then, it is determined as to whether or not a direction button input segment which is then to be evaluated among the direction button input segments 34L, 34U, 34D, 34R was actually stepped. If it was, an extent of a difference between the time at which the player actually stepped on and the time defined by the step data is determined. A user who has stepped on with a smaller timing difference obtains a higher evaluation. Specifically, the maximum score may be given for no timing difference. Also, zero may be given for a maximum difference, and even a negative score may be given for stepping on a wrong direction button input segment 34 or not stepping at all. Note that in the case where steps on two or more direction button input segments 34 are subjected to evaluation at the same time, evaluation may be made for every direction button input segment 34.

Based on the evaluation result, the state of displaying of the dance gauge 42 is updated. For example, a difference in evaluation between the two players is determined so that one of the first and second player gauges 42a, 42b, which corresponds to a superior player of the two, is extended while that to the other player is contracted. Also, a message, such as "PERFECT", "GREAT", and so on, may be displayed below corresponding reference arrows 46, 48 according to the evaluation obtained at step S202. Here, a combo number accumulated thus far for each player is stored in the main memory 26. When an evaluation "PERFECT" or "GREAT" is obtained for the latest step, the combo number 58, 70, as well as that stored in the main memory 26, is increased by one. For an evaluation "GOOD" or worse obtained for the latest step, the combo number 58, 70, as well as that which is stored in the main memory 26, is removed or reset to zero. According to the combo number 58, 70, displaying of the combo gauge 72 is updated. When either one of the first and second combo gauges 74, 76 becomes full, a change of timing guidance is imposed on the player other than the player with the full combo gauge 74, 76. Specifically, a timing guidance change is set to a change flag, which is stored in the main memory 26 so as to correspond to the other player. Specific content of the change may be determined based on the game character selected by the player with the full combo gauge and his current gauge level.

Referring again to FIG. 11, the microprocessor 14 determines whether or not the game play satisfies game end conditions (S107). The game play will end when the player continuously presses the start button input segment 36A of the controller 32 over a predetermined time period (in this case, the ongoing game play is "suspended", and the process returns to displaying of a screen image for character selection and so on) or when the music has finished playing. Alternatively, the game play may end when either the first or second dance gauge 42a, 42b has extended to the maximum (100%), while the other player's has been removed (0%). Note that when "an endless mode" is designated by operating the controller 32 in a predetermined manner, the game play will continue as long as either the first or second dance gauge 42a, 42b remains.

In the case where the game play end condition is satisfied, a winner and a loser are determined based on the evaluation result of each player, stored in the main memory 26, and displayed respectively (S108). Specifically, a player with a longer dance gauge 42 is determined to be a winner. Thereafter, it is determined as to whether or not the player has instructed, using the controller 32, continuation of the game play with the same game character (S109). In the case where he has, the process returns to step S103. In the case where he has not, on the other hand, the process returns to step S101. Meanwhile, when it is determined at Step S107 that the game play end condition is not satisfied, the process returns to S105.

According to the game machine 10 described above, a level for timing guidance (a guidance level) can be changed based on the result of evaluation on each player's stepping step performance. Alternatively, a higher number of step times than that which is originally defined by step timing may be presented to a player to request him to step more. As described above, a feeling of competitiveness between the players can be increased.

Further, besides the reference arrows 46, 48, a plurality of timing guidance arrows 50, 62 gradually approaching the reference arrows 46, 48, respectively, are displayed, whereby the state in which step timing is gradually arriving is presented to the player. This allows the player to easily ascertain step timing. Further, the speed at which the timing guidance arrows 50, 62 approach the reference arrows 46, 48 can be changed from a default speed to a speed of a half, twice, or three times the default speed. This makes a variable guidance level for enhancement of attractiveness of the game. This is applicable when the game machine 10 is not used as a match type game machine.

It should be noted that the present invention is not limited to the above.

For example, whereas the present invention is applied to a home-use game machine 11 in the above, the present invention can be similarly applied to a business use game machine. In this case, preferably, a faster storage device than a DVD-ROM 25 and a built-in monitor 18 and speaker 22 may be used.

Further, whereas a DVD 25 storing a game program and game data is used in a home-use game machine 11 in the above, any computer, such as a personal computer, and so on, which can read the content of an information storage medium storing a game program and game data and carry out information processing based on the read content, may be used.

Still further, whereas the present invention is applied to a game machine 10 allowing the player to enjoy the sense of dancing in the above, the present invention can similarly be applied to various types of games, including a drum playing game, in which the player beats a drum pad-shaped controller with a drum stick, a piano playing game, in which the player plays a piano-shaped controller, a guitar playing game, in which the player operates a guitar-shaped controller, a samba dance game, in which the player plays a maraca-shaped controller, and a dance game, in which the player's movement of his arms and hands is evaluated using a controller.

Also in these cases, when the game machine is constructed has an arrangement in which timing at which the player is required to operate the game may be presented as a guidance and the guidance level can be changed according to the result of evaluation of the player's performance in game operation, a feeling of competitiveness between the players can be increased. In addition, increase or decrease of the number of times at which each player is required to operate the game based on the result of evaluation on his operation can increase a feeling of match competition between players of other kinds of games.

Whereas a guidance level for an inferior player is changed in the above, that for a superior player may be changed instead. Specifically, a guidance level for a better player himself may be increased so that his game becomes easier. This arrangement can also arouse a feeling of match competition.

Whereas a game program and game data are provided from a DVD-ROM 25, or an information storage medium, to a home-use game machine 11 in the above, a game program and game data may be distributed through a communication network to each home.

What is claimed is:

1. A game machine for providing each of a first player and a second player with a game allowing a player to enjoy operation of the game using a controller according to game music, comprising:

timing acquisition means for acquiring game operation timing at which each of the first player and the second player operates the game;

timing data memory means for memorizing timing data defining game operation timing at which each of the first player and the second player is required to operate the game;

timing guidance means for presenting the game operation timing defined by the timing data to each of the first player and the second player;

game operation evaluation means for verifying the game operation timing acquired by the timing acquisition means with the game operation timing defined by the timing data to evaluate game operation by each of the first player and the second player; and operation timing changing means for changing game operation timing by adding one or more new game operation timing between the game operation timings defined by the timing data to at least one of the first player and the second player, based an a result of evaluation made by the game operation evaluation means.

2. A game machine according to claim 1, wherein the timing guidance means shows each of the first player and the second player a first operation timing instruction image and a plurality of second operation timing instruction images gradually approaching the first operation timing instruction image displayed on a display screen, to thereby show a state in which game operation timing is arriving, and the operation timing change means increases or decreases a number of second operation timing instruction images approaching the first operation timing instruction image with respect to the first player or the second player, to thereby increase or decrease a number of game operation timing to be presented to the first player and the second player.

3. A game machine according to claim 1, wherein the guidance unit shows each of the first player and the second player a first operation timing instruction image and a plurality of second operation timing instruction images gradually approaching the first operation timing instruction image displayed on a display screen, to thereby show a state in which game operation timing is arriving, and the operation timing change unit increases or decreases a number of second operation timing instruction images approaching the first operation timing instruction image with respect to the first player or the second player, to thereby increase or decrease a number of game operation timing to be presented to the first player and the second player.

4. A game machine according to claim 1, wherein said operation timing changing means is operative to insert randomly one step, having a predetermined divided length, between two steps.

5. A game machine according to claim 1, wherein said operation timing changing means is operative to require, when a player is originally required to make a single step with one foot, another step with the other foot.

6. A game machine according to claim 1, wherein said operation timing changing means is operative to insert one step randomly between two steps.

7. A game machine according to claim 1, wherein said operation timing changing means is operative to require a player to step in a manner of a skip.

8. A game machine according to claim 1, wherein said operation timing changing means is operative to insert between first steps a plurality of second steps of a predetermined divided length.

9. A game machine according to claim 1, wherein said operation timing changing means is operative to insert one step of predetermined divided length into a back beat position between two steps.

10. A game machine according to claim 1, wherein said operation timing changing means is operative to insert one step of a first predetermined divided length between steps which are separated from each other by at least a second divided length.

11. A game machine according to claim 1, wherein said operation timing changing means is operative to require a one of said first player and said second player, who steps less well than the other player, to make an increased number of steps.

12. A game process method for providing each of a first player and a second player with a game allowing a player to enjoy operation of the game using a controller according to game music, comprising:

a timing acquisition step of acquiring game operation timing at which each of the first player and the second player operates the game;

a timing data acquisition step of acquiring timing data defining game operation timing at which each of the first player and the second player is required to operate the game;

a timing guidance step of presenting the game operation timing defined by the timing data to each of the first player and the second player;

a game operation evaluation step of verifying the game operation timing acquired by the timing acquisition means with the game operation timing defined by the timing data to evaluate game operation by each of the first player and the second player; and operation timing changing step for changing game operation timing by adding one or more new game oneration timinas between the game operation timings defined by the timing data to at least one of the first player and the second player, based on a result of evaluation on the game operation evaluation step.

13. A game process method according to claim 12, wherein said operation timing changing step comprises inserting randomly one step, having a predetermined divided length, between two steps.

14. A game process method according to claim 12, wherein said operation timing changing step comprises requiring, when a player is originally required to make a single step with one foot, another step with the other foot.

15. A game process method according to claim 12, wherein said operation timing changing step comprises inserting one step randomly between two steps.

16. A game process method according to claim 12, wherein said operation timing changing step comprises requiring a player to step in a manner of a skip.

17. A game process method according to claim 12, wherein said operation timing changing step comprises inserting between first steps a plurality of second steps of a predetermined divided length.

18. A game process method according to claim 12, wherein said operation timing changing step comprises inserting one step of predetermined divided length into a back beat position between two steps.

19. A game process method according to claim 12, wherein said operation timing changing step comprises inserting one step of a first predetermined divided length between steps which are separated from each other by at least a second divided length.

20. A game process method according to claim 12, wherein said operation timing changing step comprises requiring one of said first player and said second player, who steps less well than the other player, to make an increased number of steps.

21. An information storage medium storing a program for providing each of a first player and a second player with a game allowing a player to enjoy operation of the game using a controller according to game music, the program causing a computer to execute:
- a timing acquisition step of acquiring game operation timing at which each of the first player and the second player operates the game;
- a timing data acquisition step of acquiring timing data defining game operation timing at which each of the first player and the second player is required to operate the game;
- a timing guidance step of presenting the game operation timing defined by the timing data to each of the first player and the second player;
- a game operation evaluation step of verifying the game operation timing acquired by the timing acquisition means with the game operation timing defined by the timing data to evaluate game operation by each of the first player and the second player; and
- an operation timing changing step for changing game operation timing by adding one or more new game operation timings between the game operation timings defined by the timing data to at least one of the first player and the second player, based on a result of evaluation on the game operation evaluation step.

22. A game machine for providing each of a first player and a second player with a game allowing a player to enjoy operation of the game using a controller according to game music, comprising:
- an acquisition unit operative to acquire game operation timing at which each of the first player and the second player operates the game;
- a data memory operative to memorize timing data that defines game operation timing at which each of the first player and the second player is required to operate the game;
- a guidance unit operative to present the game operation timing defined by the timing data to each of the first player and the second player;
- a game operation evaluation unit for verifying the game operation timing acquired by the acquisition unit with the game operation timing defined by the timing data to evaluate game operation by each of the first player and the second player; and
- an operation timing changing unit operative to change game operation timing by adding one or more new name operation timinas between the game operation timings defined by the timing data to at least one of the first player and the second player, based on a result of evaluation made by the game operation evaluation unit.

* * * * *